United States Patent [19]

Guenther

[11] Patent Number: 4,870,718
[45] Date of Patent: Oct. 3, 1989

[54] APPARATUS FOR SUSPENDING OR SECURING OBJECTS

[76] Inventor: Jacob Guenther, 32224 Pineview Avenue, Clearbrook, B.C., Canada, V2T 1R3

[21] Appl. No.: 266,084

[22] Filed: Nov. 1, 1988

[51] Int. Cl.$^4$ .................. A22B 1/00; A01K 37/00
[52] U.S. Cl. ...................................... 17/44.1; 211/66; 248/113; 119/97.1
[58] Field of Search ............... 17/44.1, 44; 248/113, 248/110; 211/62, 63, 65, 66, 70.2, 171; 119/97 R

[56] References Cited

U.S. PATENT DOCUMENTS

| | | |
|---|---|---|
| 1,331,779 | 7/1919 | Shank . |
| 1,407,025 | 2/1922 | Geese .................................. 248/113 |
| 1,488,949 | 4/1924 | Sommer ............................... 248/113 |
| 1,563,817 | 12/1925 | Wright . |
| 2,110,442 | 3/1938 | Kendal . |
| 2,438,608 | 3/1948 | Johnson . |
| 2,533,941 | 12/1950 | Johnson . |
| 2,625,707 | 1/1953 | Liittjohann . |
| 2,688,765 | 9/1954 | Sharp et al. . |
| 2,739,347 | 3/1956 | Sharp et al. . |
| 3,009,194 | 11/1961 | Roth . |
| 3,166,785 | 1/1965 | Lemmond . |
| 3,243,841 | 4/1966 | Altenpohl . |
| 3,581,339 | 6/1971 | Smith .................................. 17/44.1 |
| 4,050,416 | 9/1977 | du Chaffaut et al. ................ 17/44.1 |
| 4,051,573 | 10/1977 | Volk .................................... 17/44.1 |
| 4,372,009 | 2/1983 | Linville . |
| 4,524,488 | 6/1985 | van den Bogert . |

Primary Examiner—Willis Little
Attorney, Agent, or Firm—Hughes & Multer

[57] ABSTRACT

A device for suspending and securing animals, particularly live poultry, or for suspending and securing objects which have an elongated portion such as tools or janitorial implements. The device comprises a generally "U"-shaped frame with an object grasping means attached thereto. The frame has two arms pivotably attached thereto, and two resilient flexible gripping members are provided for attachment between the distal ends of the pivotable arms and the frame. The flexible gripping members are attached in a manner to form a generally "X"-shaped object grasping area at the forward open end of the frame when the device is in an open or ready position. When an object such as chicken legs are pushed into the central gripping area, the two pivotable arms rotate in an inward and downward direction causing the flexible gripping members to grip around the object. As downward pull of gravity forces the object to pull downwardly on the flexible gripping members, due to friction between the object and the resilient flexible gripping members, the flexible gripping members will tend to grip the object more tightly. The flexible gripping members store spring energy as the hanger device is moved from the open position to the object gripping position. As an object is removed from the device by lifting upwardly and outwardly on the object, the spring energy stored in the flexible gripping members automatically restores the device to the open position.

20 Claims, 6 Drawing Sheets

APPARATUS FOR SUSPENDING OR SECURING OBJECTS

TECHNICAL FIELD OF THE INVENTION

The present invention relates generally to a novel apparatus for suspending or securing objects. One particularly useful application of the invention is for securing live poultry during transportation operations. The invention also provides an improved apparatus for suspending and securing poultry or other animals during slaughter and subsequent processing operations. In addition the present invention provides an improved device to secure brooms, mops, garden implements, tools, and other objects The invention will be disclosed by reference to these uses, however, it is to be understood that the invention is not to be limited thereby but such disclosures are merely illustrative of the many and varied uses for the invention

BACKGROUND OF THE INVENTION

In the poultry production business, it is frequently necessary to move poultry from one location to another. For instance, it may be necessary to move chickens from one house to another when young chickens are sold by one grower for raising by another grower. In such an instance, it may be necessary to transfer chickens from one chicken house to a truck, and then from the truck to a second chicken house. Also, production efficiencies are sometimes achieved by separating various chickens on a farm and transferring live chickens from a present location to a new location.

Known hanger devices are ill-suited to the handling of live poultry as they may injure the legs of the birds. Currently, such transfer operations are accomplished by a labor intensive manual transfer process wherein workmen grasp poultry by the legs with their hands and move the fowl between suitable containers. Quite often, a live poultry transfer may involve tens of thousands of birds, if not hundreds of thousands of birds, thus there is a requirement for a large crew of workmen to accomplish the transfer in a short period of time.

When poultry are ready for slaughter and processing, they are typically hung by one or both legs from a hanger device that is propelled through a series of processing steps by means of a conveyer chain or the like. Known devices used in poultry and other animal processing operations use hooks, shackles, and the like for holding animals in a suitable position. While many such devices will securely hold an animal, it is often difficult to remove the animal from such devices Often, manual manipulation of the hanger device is required to insert, to remove, or to replace an animal or object in the hanger.

Various U.S. patents disclose hangers or shackles for use in processing operations:

U.S. Pat. No. 1,331,779 issued July 29, 1919, to Shank, discloses an adjustable hanger having two adjustable bars, with means for holding the bars in different relative adjusted positions. The extensible ends of the bars have a concave portion through which is passed a rope having an end loop portion adapted to engage an object, e.g., legs, against the concave portion. then the hanger is suspended, the end loop of the rope tightens against the secured object, which in turn is held against the solid concave portion of the hanger. While an object can be reliably held by such hanger, it is difficult to insert and to remove objects from such a device. Such insertion and removal requirements also demand extra time of personnel during processing operations, thus adversely affecting labor productivity.

U.S. Pat. No. 2,110,442 issued Mar. 8, 1938, to Kendal, discloses a frame for picking poultry in a poultry processing plant. In that device, the legs of the poultry are secured between spaced parallel co-extensive oblong strips which have inwardly projecting teeth on their inner faces This device also requires time consuming manipulation for object removal, and it is not suitable for use with live poultry.

U.S. Pat. No. 2,438,608 issued Mar. 30, 1948, to Johnson, discloses a shackle for use on a conveyer in a poultry preparation operation wherein spring-loaded generally "J"-shaped clamps can be pushed inwardly against a concave surface to secure legs of a chicken. The release of the clamp is by manual reset button which disengages a flat spring from a ratcheting mechanism. Both the insertion and the release operations require "two-hand" operation in this device.

U.S. Pat. No. 2,533,941 issued Dec. 12, 1950, to Johnson, discloses an inverted "T" shaped poultry shackle having notches on the upper portion of both sides of the "T" shaped member. A jaw is hingedly mounted on the "T" and can be moved toward the intersection of the "T" to secure poultry legs between the "T" and the jaw. The jaw is released by a manually operable spring biased bolt latch.

U.S. Pat. No. 2,625,707 issued Jan. 20, 1953, to Liittjohann, discloses a gambrel for holding poultry in a processing plant The holder is comprised of a pair of spring-loaded jaw assemblies which are pivotedly mounted at opposite sides of a fixed plate. The jaw assemblies pivot from an open position to a closed position when an object such as a poultry leg is inserted into the open area of the plate. When the jaw assembly reaches the closed position, it is locked by a spring-loaded device to secure the poultry leg. Use of this device requires manipulation of the release mechanism while simultaneously supporting the object being secured. Thus, two hands are normally required for operation.

U.S. Pat. No. 2,739,347 issued Mar. 27, 1956, to Sharp et al., discloses a poultry shackle for holding fowl during a food processing operation. The shackle comprises a pair of jaw members pivotedly mounted with respect to a pair of spaced arms. The arms are adapted to bias toward an open position where the poultry holding jaw members are in an open position. The arms are secured in a closed position by a spaced follower member which is operated through a cam and spring mechanism U.S. Pat. No. 3,009,194 issued Nov. 21, 1961, to Roth, shows a poultry hanger device useful to facilitate cutting poultry into pieces. The device is merely a hanger device having an upwardly and laterally extending pair of prongs which forms a slot with an open end for holding poultry. It does not provide any securing or gripping action for the object being transported.

U.S. Pat. No. 3,166,785 issued Jan. 26, 1965, to Lemmond, discloses a hinged two-piece generally "W"-shaped poultry shackle for use in a poultry processing plant. The shackle is adapted so that as it is pulled across a disengaging means, the shackle orientation is reversed and the legs of poultry are released from the shackle Lack of a securing means in this device prevents its use for transporting live poultry.

U.S. Pat. No. 3,243,841 issued Apr. 5, 1966, to Altenpohl, discloses a poultry shackle for use on an overhead conveyer. The shackle uses a pair of frames slideably connected together, wherein one frame attaches to the conveyer and the other frame combines with the first frame to form divergent pockets for wedgingly retaining the extremities, i.e. legs, of a fowl disposed therein, by force of gravity acting on the fowl. The shackle is not suitable for transportation of live fowl, however, as the shackle's wedging mechanism may damage their legs.

U.S. Pat. No. 4,050,416 issued Sept. 27, 1977, to du-Chaffaut et al., discloses a sling device for suspending an object such as an animal or other article. The device has a single cord-like flexible member, wherein the cord-like member is attached at one end to a biased moveable arm, and at the other end to a fixed bracket. then a force is exerted on the single cord-like flexible member, the moveable arm is positioned so as to form a loop in the cord-like member to hold the object.

U.S. Pat. No. 4,372,009 issued Feb. 8, 1983, to Linville, discloses a rigid support shackle and a pneumatically operated piston cylinder object removal mechanism therein a cylindrical piston striker mechanism acts upon the support shackle device, causing it to rapidly swing out from under an object being supported. The device does not have any means to secure the object being supported by the rigid arms of the generally "V"-shaped support. And although the piston operated cylinder eliminates manual labor requirements for removal of the object being suspended, the power requirements and weight of the removal device are not suitable for use at remote locations Further since no provision is made to secure an object in the hanger, the device is not suitable for transfer of live poultry.

U.S. Pat. No. 4,524,488 issued June 25, 1985, to van den Bogert, discloses a positioning apparatus for guiding slaughtered animals past several butchering stations. The apparatus uses rigid hooks to hold slaughtered animals, and is not suitable for transporting live birds.

For securing objects such as brooms, other types of devices have been utilized. U.S. Pat. No. 1,563,817 issued Dec. 1, 1925, to Wright, shows a pair of cam-like devices pivotedly mounted in a spaced relationship so that a broom or like object can be inserted between the cams so that the cams engage the broom. The weight of the cams themselves tend to force the cams to an operative position acting upon an object placed in the device. Through friction between the cam and the object, the downward gravity force acting on an object urges the cams toward an object, thus securing it tightly.

In suspension and securing apparatus of the type under consideration, it is undesirable to require manual manipulation of the apparatus to insert an object therein, to require an additional manual operation to remove an object therefrom, or to require manipulation of the apparatus to restore it to an open position. Also, it is undesirable to require an operator to impart an outwardly acting force on an object being secured in a danger or holder device, as such force may result in either the object or the operator being accelerated outwardly When the securing action of the holder is quickly released Such outward acceleration may be unsafe for the operator and to surrounding property. In particular, there exists the need for an improved hanger device which automatically grasps an object when an object is placed therein, and which automatically restores itself to the open position when an object is removed therefrom. Additionally, it would be desirable to remove an object and to automatically restore the apparatus to an open and ready position with only slightly more force than is necessary to overcome the gravity force acting on an object being suspended.

OBJECTS OF THE INVENTION

In order to overcome the many problems inherent in known devices, the present invention provides a new and useful method and device for suspending and securing objects.

Accordingly, it is an object of the present invention to provide an object gripping device which allows an object to be easily positioned in the device.

It is also an object of the present invention to provide a hanger device which reliably grips an object to secure it in the device.

It is a feature of the present invention that the apparatus automatically returns to the open position when an object is removed, without need for the manipulation of the apparatus by an operator.

Another feature of the present invention is that the apparatus is adapted to be easily secured at a desired location such is a conveyer chain, hanger racks, or the like.

Yet another feature of the present invention is that the apparatus is adapted for multiple use on a live poultry transport apparatus.

It is an advantage of the present invention that an object can be easily removed from the device without manipulation of release mechanisms.

It is another advantage of the present invention that an object can be inserted into or removed from the device with only a single hand of a workman, so that the other hand remains free.

It is yet another advantage of the present invention that when poultry are secured in the device, resilient flexible gripping members do not injure the legs of live poultry. This is of particular advantage in the live poultry transfer operations described above.

Additional objects, advantages and novel features of the invention will be set forth in part in the description which follows, and in part will become apparent to those skilled in the art upon examination of the following or may be learned by practice of the invention The objects and advantages of the invention may be realized and attained by means of the instrumentalities and combinations particularly pointed out in the appended claims.

BRIEF SUMMARY OF THE INVENTION

I have now invented and am disclosing herein a novel hanger device for suspending or securing objects which solves the problems identified above by insuring that an object is automatically secured when placed in the device, by allowing an object to be released without manipulation of the device by an operator, and by automatically restoring the device to an open or "ready" position when an object is removed therefrom.

My invention provides a hanger device comprising a generally "U"-shaped frame or base having first and second laterally spaced side sections defining therebetween a forwardly open gripping area to receive an object At the distal ends of the side sections, rigid arms having a pivot end and an outer end portion are pivotally mounted. The outer end portions of the arms pivot rearwardly toward the center of the "U"-shaped frame, from a forwardly extending open position to a closed object gripping position. First and second flexible gripping members, each having a first end and a second end, are provided. The first end of the first flexible gripping member is connected to the outer end portion of the first arm, and the second end of the first flexible gripping member is connected to the second side section of the frame. The first end of the second flexible gripping member is connected to the outer end portion of the second arm, and the second end of the second flexible gripping member is connected to the first side section of the frame.

The arms and the flexible gripping members are arranged in a manner that when the apparatus is in an open position, the two gripping members extend oppositely across the object gripping area in a generally "X"-shaped configuration between the frame and the outer end portions of the pivotable arms. When an object is inserted into the "X"-shaped open gripping area of the apparatus, the flexible gripping members automatically engage object. As the object is released so that gravity is allowed to act on the object, friction between the object and the flexible gripping members urges the flexible gripping members against the object, and the object is further secured. When in the object gripping position, the first and second pivotable arms extend oppositely to one another across an open forward portion of the gripping area. The pivotable arms are thus moved from the open position to the object gripping position by an inward and downward force applied to the outer end portion of the arms from the pair of flexible gripping members. Objects are secured by the effect of their own weight acting against the flexible gripping members. It can be seen then that in the apparatus of the present invention, the gravity force acting on an object and the friction between an object and the flexible gripping members act together to securely hold an object in place. Upon removal of the gravity force acting on an object, by removing an object upwardly and outwardly from the hanger device, the arms and flexible gripping members of the present invention are automatically restored to their open or ready position by the spring force stored in the resilient flexible gripping members.

BRIEF SUMMARY OF THE DRAWINGS

The invention may be more clearly understood by reference to the accompanying drawings thereof, wherein.

DETAILED DESCRIPTION OF THE INVENTION

The present invention involves a novel and improved apparatus to secure, hang, or suspend objects. While the illustrated embodiments of the invention show hanger devices generally mounted in a horizontal configuration so as to suspend objects vertically as they hang from the apparatus, such is not intended to limit the invention to the particular configuration or to limit it to a specific size or shape. The apparatus of the present invention is uniquely capable of providing a way to secure objects having a force acting thereon, although the invention will be disclosed in its normal configuration with a downward gravity force acting upon an object being secured.

Figure 1:
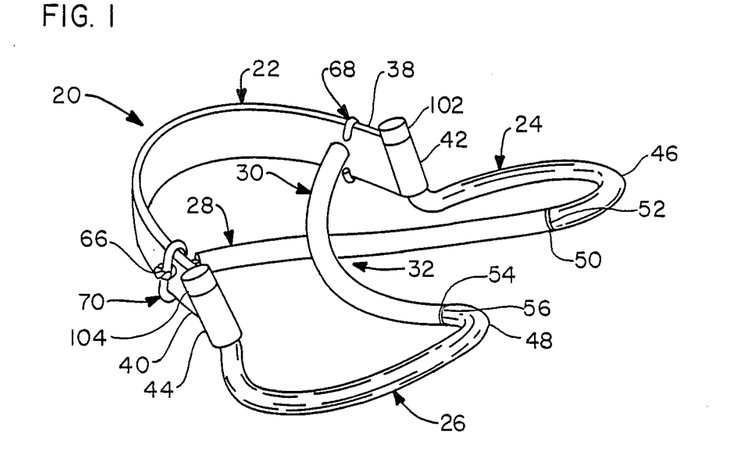
FIG. 1 is a perspective view of the present hanger device showing the device in its open and unused position.

Attention is now directed to FIG. 1. Hanger device 20 is comprised of five (5) basic parts, including a generally "U"-shaped frame base 22, a pair of pivotable arms 24 and 26, and a pair of elongated flexible gripping members 28 and 30. The pivotable arms 24 and 26 have first end portions pivotedly mounted on base 22, and are provided to reposition flexible gripping members between an open object engaging position and a closed object securing position. The elongated flexible gripping members 28 and 30 which are provided to securely grip an object, are each connected at a first end to the outer end portion of pivotable arms 24 and 26, and at a second end to frame 22. When the hanger apparatus 20 is in an open position, the two elongated flexible gripping members 28 and 30 extend oppositely across a forwardly open gripping area 32 in a generally "X"-shaped configuration, so that they may engage an object which is to be secured.

Figure 2:
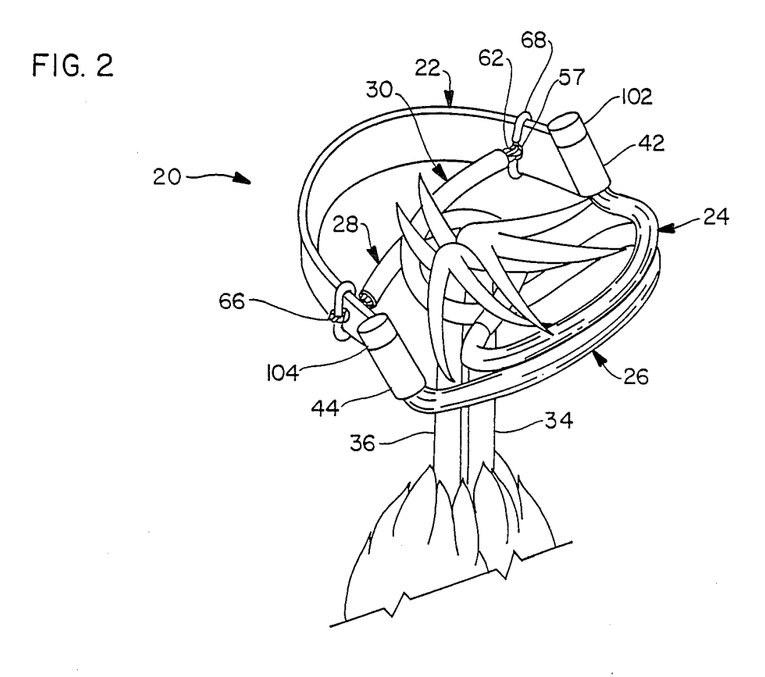
FIG. 2 is a perspective view of the present invention showing the hanger device in its closed operating position, wherein it is securing a fowl between the hanger's flexible gripping members.

As can be seen in FIG. 2, when an object such as chicken legs 34 and 36 are inserted into the gripping area 32 at the open end of frame 22 of hanger apparatus 20, the elongated flexible gripping members 28 and 30 automatically engage objects 34 and 36. As the objects 34 and 36 are released so that gravity is allowed to act on said objects, friction between said objects and the flexible gripping members 28 and 30 creates a downward acting force on the flexible gripping members 28 and 30, which in turn urge the pivotable arms 24 and 26 in an inward and downward direction. The result of the inward and downward movement of said pivotable arms 24 and 26 is that the elongated flexible gripping members 28 and 30 are further urged against objects such as chicken legs 34 and 36, thus increasingly securing said objects. In a preferred embodiment, each of the elongated flexible gripping members 28 and 30 comprise a spring which upon closure of the hanger device 20 stores sufficient energy to act upon the distal ends of the respective pivotable arms 24 and 26, so that said pivotable arms and the elongated flexible resilient gripping members 28 and 30 are restored to their open positions when an object is removed from the hanger device.

Figure 3:
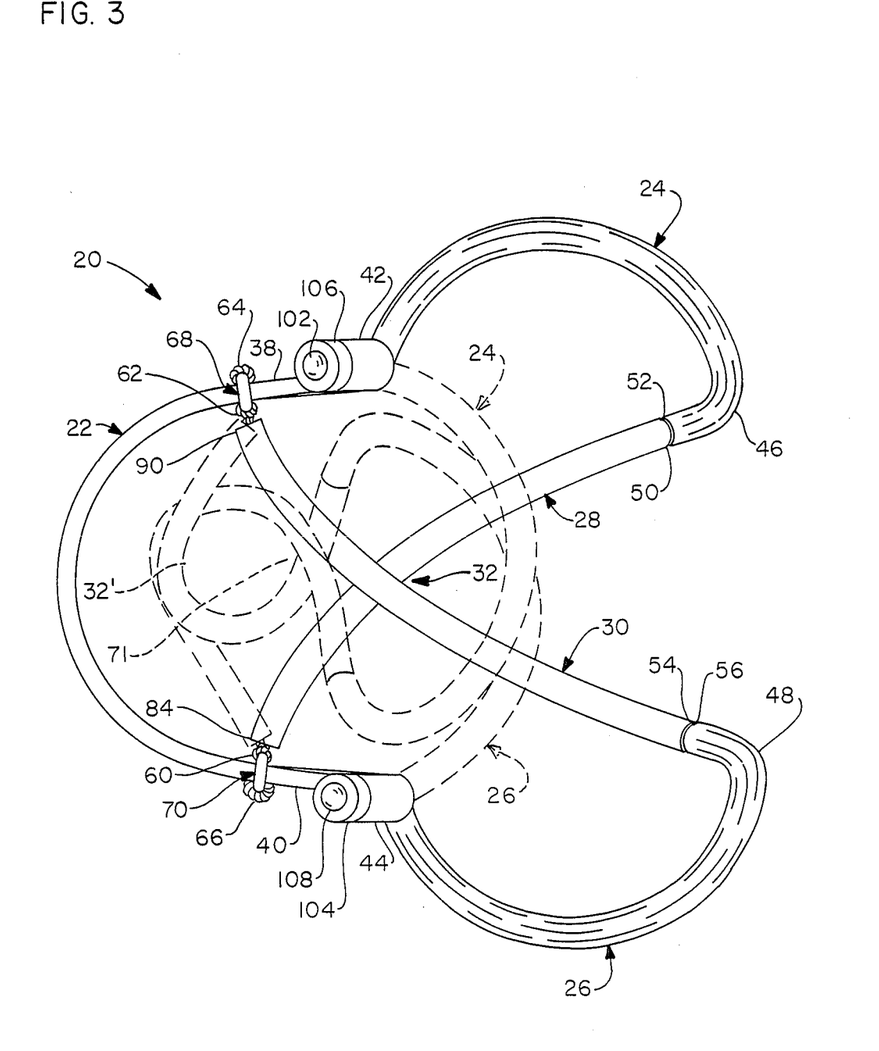
FIG. 3 is a top plan view of the present invention showing the hanger device in its open or ready position, and showing with phantom lines the hanger device in its closed object grasping position.

Details of the present invention and the operation thereof may be more clearly understood by reference to FIG. 3. In FIG. 3, the hanger device 20 is shown in a top plan view in its open and fully extended position, with most moving parts shown by phantom or dashed lines indicating their position when the device 20 is in a closed object grasping position. There is shown one embodiment of a hanger apparatus 20 having a generally "U"-shaped frame base 22. Frame 22 has a first side section 38 and a second side section 40. First side section 38 is connected to a first pivotable arm 24 at pivot 42. Second side section 40 is connected to a second pivotable arm 26 at pivot 44. A first elongated resilient flexible gripping member 28 having two ends is affixed at the first end to the distal end of pivotable arm 24, and is affixed at the second end to second side section 40 of frame 22. A second elongated resilient flexible gripping member 30 having two ends is affixed at a first end to the distal end of pivotable arm 26, and is affixed at the second end to first side section 38 of frame 22.

While pivotable arms 24 and 26 are provided in a generally "C"-shaped configuration, it is clear that various other shapes, including either a straighter arm member or a more angular arm member will work as well. However, in the preferred embodiment the maximum radius of pivotable arms 24 and 26 (noted as elbow 46 of arm 24 and as elbow 48 of arm 26) does not exceed the clearance between pivot point 44 and the inside of first side section 38, nor the clearance between pivot point 42 and the inside of second side section 40.

Resilient flexible gripping members 28 and 30 extend from distal ends of pivotable arms 24 and 26 respectively to mounting locations on frame 22 which may vary according to the particular embodiment of the invention. The distal end of the first pivotable arm 24 is adapted to provide a joint 50 with elongated flexible gripping member 28 and to secure the elongated flexible gripping member 28 by means 52 such as crimping, soldering, or brazing near joint 50. Similarly, the pivotable arm 26 is adapted to provide a joint 54 with elongated flexible member 30 and to secure the elongated flexible gripping member 30 to the rigid arm 26 by means 56 such as crimping, soldering, or brazing near joint 54 Flexible gripping members 28 and 30 are attached to frame 22 at mounting locations 57 and 58, typically defined by apertures as are more clearly visible in FIG. 6. Returning to FIG. 3, wire portions 60 and 62 of elongated flexible members 28 and 30 respectively are formed into loop ends 64 and 66 respectively. Securing means 68 is provided to position loop end 64 at mounting location 57, and securing means 70 is provided to position loop end 66 at mounting location 58 Securing means 68 and 70 may include a "C"-shaped clamp, as illustrated, or other shaped articles adapted to be fixedly attached to loops 64 and 66, or may comprise a weld between said loops and frame 22, or other suitable arrangements. It can be seen that flexible gripping members 28 and 30 are thus connected at one end to pivotable arms 24 and 26 respectively, and are connected at the other end to "U"-shaped frame 22 in a manner so that the flexible gripping members 28 and 30 cross each other at a central gripping location 32.

In order for the hanger apparatus 20 to function most effectively, the pivotable arms 24 and 26 must be mounted so that in the closed or object grasping position, neither pivotable arm interferes with the freedom of movement of the other pivotable arm. While arms that would meet in the center of the frame might provide sufficient movement of flexible members 28 and 30 for adequate support of some objects, it is clear that a maximum gripping action on an object can be provided there the distal ends of pivotable arms rotate to a position where opposing "U" shapes are formed by the flexible members 28 and 30. Then, the central object gripping location 32 is transformed from an "X"-shaped area adapted for receiving an object to a pair of opposed interlocking "U"-shaped flexible gripping members 28 and 30 to provide maximum gripping action on an object placed in the hanger device 20. said another way, in the illustrated embodiment, flexible gripping member 28 is arranged under flexible gripping member 30 at the rear of the object gripping area, and flexible gripping member 28 is arranged over flexible gripping member 30 at the front of the object gripping area. Thus, flexible gripping members 28 and 30 are wrapped around an object placed in the hanger device 20 and consequently are urged against the object to secure it in the hanger device 20.

As an object is pushed rearwardly against the central object gripping area located at 32, said location 32 moves rearwardly toward frame 22, to a new location 32'. Rotation of pivotable arms 24 and 26 also eventually causes flexible members 28 and 30 to cross at a location 71 forward of new central gripping location 32', thereby forming a generally oval area between the new central gripping location 32' and the second crossing location 71.

Figure 4:
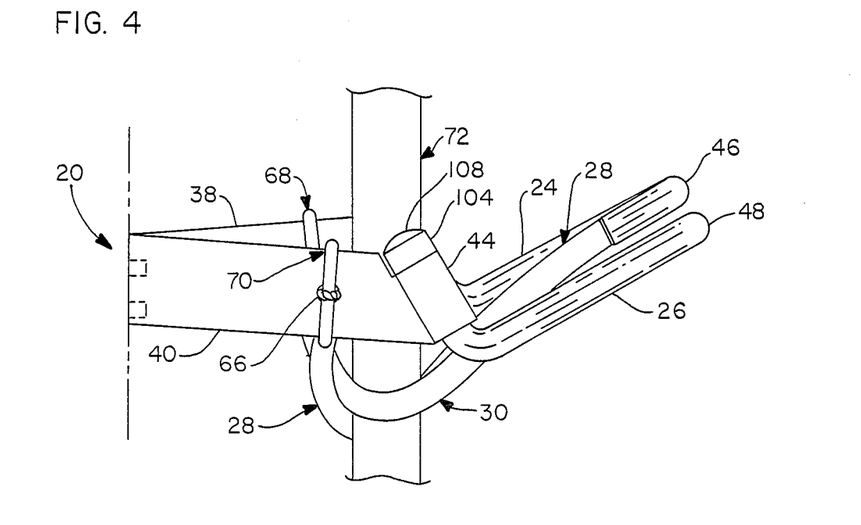
FIG. 4 is a side view of the hanger device showing the device engaging an object and moving toward a closed object securing position.

FIG. 4 provides a side view illustrating the interlocking action of flexible gripping members 28 and 30 when securing an object 72 as it is being placed into the hanger apparatus 20. This figure shows how flexible gripping member 38 is arranged under flexible gripping member 30 at the read of the object grasping area. The figure also illustrates clearance between pivotable arms 24 and 26 as the distal ends of said arms move in an inward downward direction toward a closed position.

Figure 5:
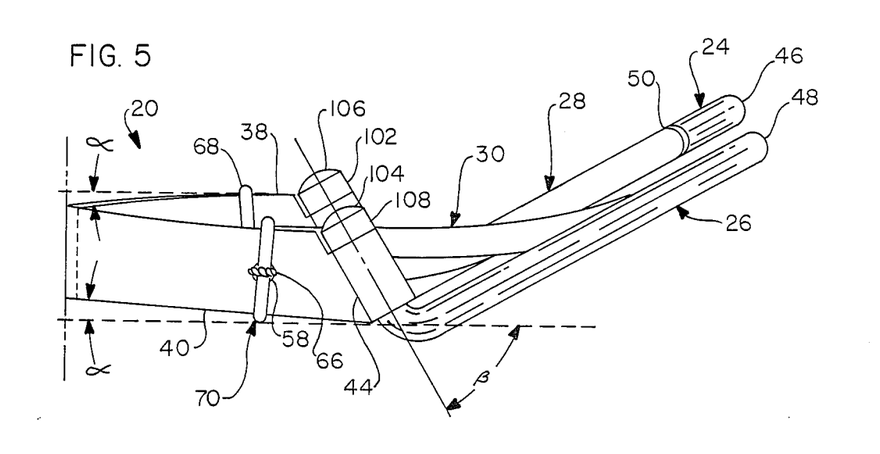
FIG. 5 is a side view of the hanger device similar to FIG. 4, however in the present FIG. 5 the hanger device is shown in its open and unused position.
Figure 6:
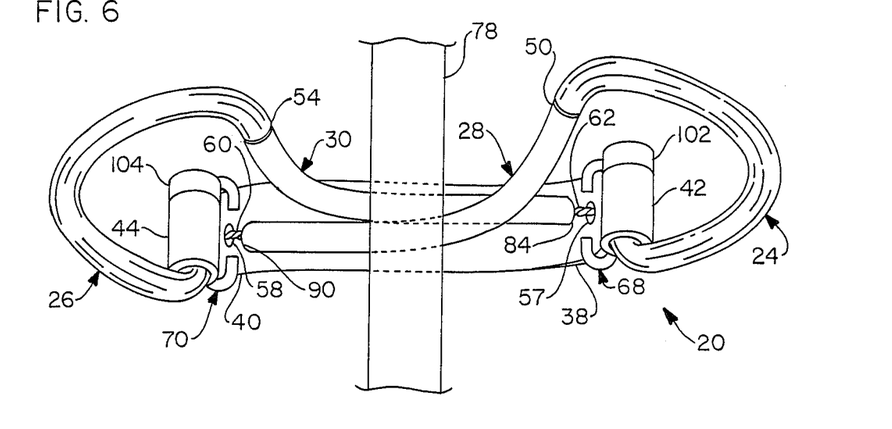
FIG. 6 is a horizontal front view of the present invention showing the hanger device in its open or ready position, with an object being positioned for insertion to the central gripping area of the device.
Figure 10:
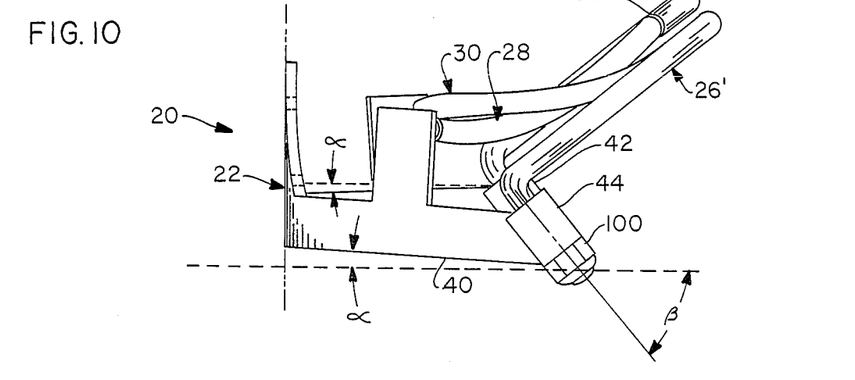
FIG. 10 is a side view of the alternate embodiment of the present invention first illustrated in FIG. 9, with the hanger device shown in its open and ready position.
Figure 11:
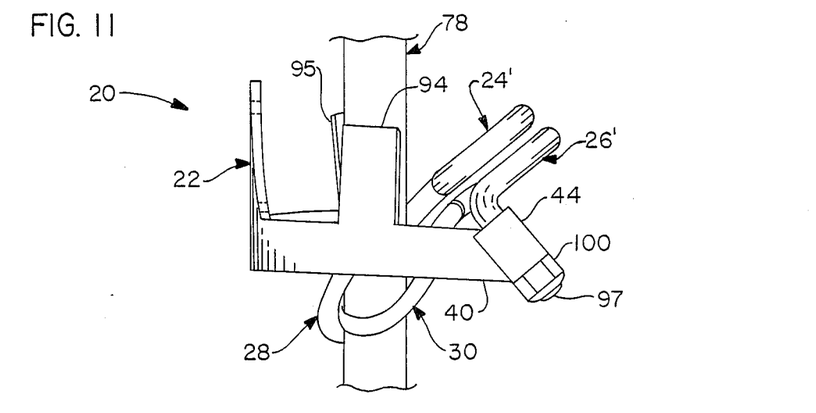
FIG. 11 is a side view of the alternate embodiment of the present invention first illustrated in FIG. 10; however, here the device is shown in its closed object securing position, with the flexible resilient members clearly seeing gripping an object which has been inserted into the device.
Figure 12:
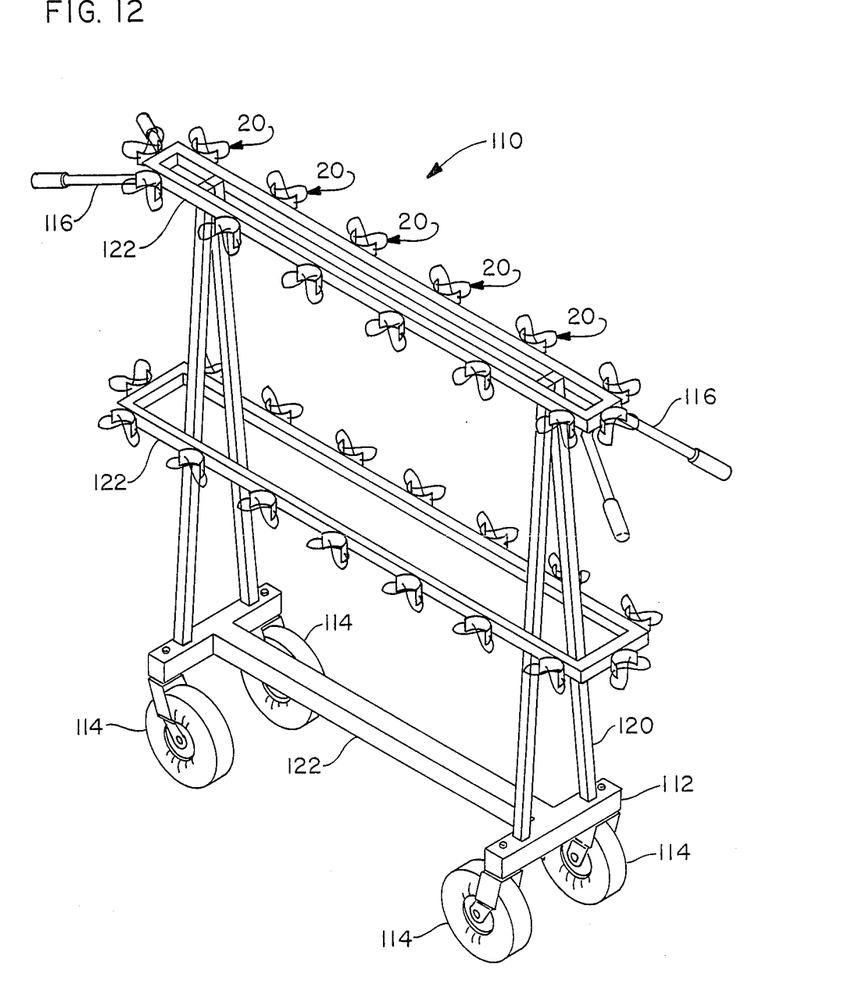
FIG. 12 is a perspective view of a mobile pull cart on which a plurality of hanger devices have been mounted for transporting live poultry according to the present invention.

FIG. 5 illustrates one means for providing the required offset to assure clearance between pivotable arms 24 and 26 as they move inwardly and downwardly toward a closed object securing position. It can clearly be seen tat the first side section 38 and the second side section 40 of "U"-shaped frame 22 are offset by approximately 10 degrees (10°), i.e. each end of the "U"-shaped frame is offset from the horizontal in opposing directions by an angle alpha ($\alpha$) of approximately 5 degrees (5°). Thus, a pivot mounting location 42 on the first side section 38 and a pivot mounting location 44 on the second side section 40 are provided so that the counter rotating pivot arms 24 and 26 do not interfere with each other Also, FIG. 6 illustrates this offset from a front horizontal position. Alternate means to achieve the same objective could clearly be utilized, such as extension of the axial end of pivot arms below the pivot mounting locations 42 and 44. In another embodiment of the invention as illustrated in FIGS. 10, 11, and 12, it can be seen that the offset between the first side section 38 and the second side section 40 of the "U"-shaped frame 22 is approximately 7.5 degrees (7.5°), i.e., each end of the "U"-shaped frame is offset from the horizontal in opposing directions by an angle alpha ($\alpha$) of between three (3) and four (4) degrees. Depending upon the length of the first side section 38 and the second side section 40 of frame 22, the offset between said side sections may be selected from a range between five degrees (5°) and fifteen degrees (15°), or an even wider range, so long as the necessary clearance is provided for pivotable arms 24 and 26.

Returning now to FIG. 5, it can be seen how the pivot mounting locations 42 and 44 are inclined with respect to the plane of frame 22, thus creating an angular pivot axis, so that when the hanger 20 is in the open and ready position, the distal ends of the pivotable arms 24 and 26 are in an elevated position then compared to pivot shaft elbows 74 and 76. Thus, when an object is inserted into central gripping area 32, distal ends of pivot arms 24 and 26 traverse downward and inward as they move to a closed position.

Figure 9:
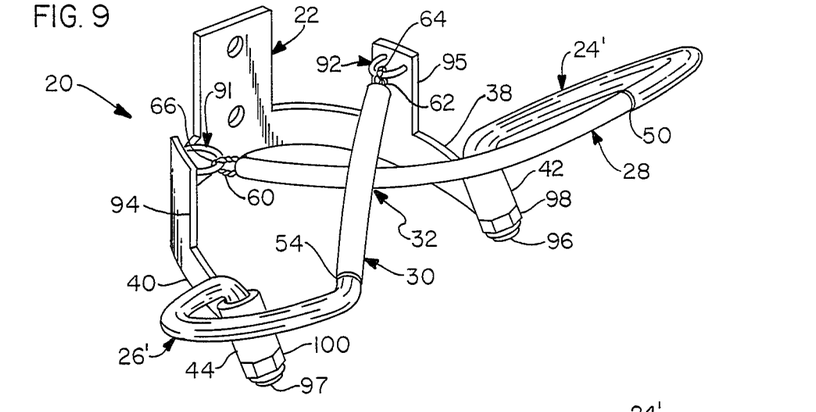
FIG. 9 is a perspective view of another embodiment of the present invention showing a "U" shaped frame with integral mounting bracket and extended support posts for the resilient flexible gripping members.

In the embodiment of the present invention shown in FIGS. 1 through 7, the angle of inclination beta ($\beta$) of the axes of rotation of the pivot mounting locations 42 and 44 from the horizontal—plane of frame 22 is approximately 60 degrees (60°). In another embodiment of the invention as illustrated in FIGS. 9 through 11, the inclination of the axes of rotation of the pivot mounting locations 42 and 44 is an angle beta ($\beta$) of approximately 45 degrees (45°). The actual inclination may be varied over an even greater range, so long as an inward and downward motion is imparted to the distal ends of pivotable arms 24 and 26 when an object is inserted into the central gripping area 32. However, an angle beta ($\beta$) selected between thirty five degrees (35°) and seventy degrees (70°) provides good results.

Referring to the drawings generally, the exact location of pivot arms 24 and 26 when hanger 20 is in its closed object holding position may vary, depending upon the shape of an object and the force acting on an object being secured, as well as upon the length and shape of flexible members 28 and 30, and upon length and shape of pivotable arms 24 and 26. Although a stop or end point for the downward and inward pivot action of pivotable arms 24 and 26 could be provided, the present invention makes such provision unnecessary. If the same hanger device 20 is used to secure objects of differing sizes, such provision may be undesirable. When an object is inserted into the hanger device 20, flexible object grasping members 28 and 30 are each deformed to approximately a "U" shape Since the "U"-shaped members are positioned to oppose each other, friction between an object and flexible gripping members 28 and 30 allows an object to be reliably secured by flexible gripping members 28 and 30 acting together. However, the position of pivotable arms 24 and 26 is determined by forces imparted on said pivotable arms from flexible members 28 and 30. To achieve maximum securing force on an object by opposing "U"-shaped loops of the flexible gripping members 28 and 30, it is desirable for said loops of the flexible gripping members 28 and 30 to be in a horizontal position. It can be seen that the present hanger device 20 achieves such objective by repositioning the first ends of the first and second flexible gripping members 28 and 30 to a position approximately level with the mounting positions 57 and 58 of the second ends of said first and second flexible gripping members 28 and 30. This repositioning is achieved by proper sizing and positioning of various components, and in particular by selecting suitable lengths for flexible gripping members 28 and 30, and suitable length and pivot inclination for pivotable arms 24 and 26.

Figure 7:
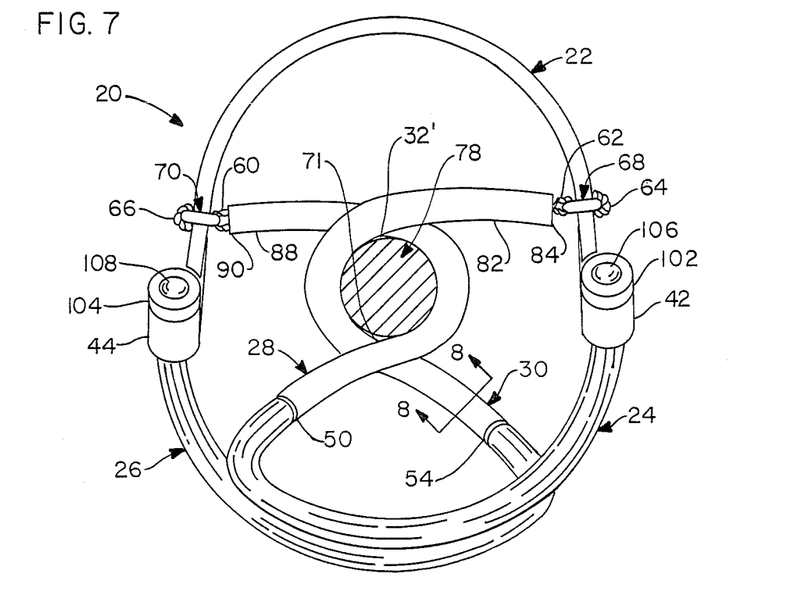
FIG. 7 is a top plan view of the present invention showing the hanger device in its closed position with an object secured therein, and is illustrative of use of the hanger device.

FIG. 7 shows a hanger apparatus 20 in a closed, object grasping position The elongated resilient flexible gripping members 28 and 30 are shown with each flexible gripping member 28 and 30 in contact with secured object 78 for approximately one-half of the circumference of object 78. This figure is illustrative 5 of the situation where object 78 is a broom, tool, implement, or the like.

Thus, the improved way to engage an object being secured can now be nearly seen. The arc of contact between object 78 and flexible gripping members 28 and 30 is automatically increased as the downward gravity force acting on object 78 increases downward force on the flexible gripping members 28 and 30, thus rotating pivotable arms 24 and 26 in an inward and downward direction. Thus, as force on object 78 is increased, the hanger device 20 of the present invention increases its grasp on the object 78 thus providing increased security for the suspended object 78.

Figure 8:
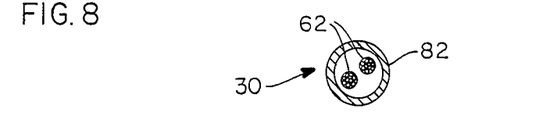
FIG. 8 is a vertical sectional view of a resilient flexible gripping member, taken along the line 8—8 of FIG. 7.

FIG. 8 illustrates a cross-section of flexible gripping member 30. The elongated flexible resilient gripping member 30 is comprised of two strands of flexible steel cable 62. The two strands of steel cable 62 are covered by a resilient tubular rubber casing 82.

As can be seen in FIG. 7, casing 82 terminates at one end at joint 54 adjacent to pivotable arm 26, and at the other end casing is provided to near mounting location 57 at the inside of first side section 38, where casing ends at casing terminus 84. Similarly, flexible gripping member 38 is comprised of two strands of flexible steel cable. Cables 62 are covered by resilient tubular rubber casing 88, running from joint 57 to casing terminus 90.

In the preferred embodiment, cable 60 and 62 just be of composition and elasticity whereby reproducible spring forces are provided when the cables 60 and 62 are repeatedly deformed and then released, so that the hanger device 20 is biased toward the open position and when at rest returns to the open or ready position. Spring energy and force provided by the resilient flexible members 28 and 30 is able to repeatedly reposition pivotable arms 24 and 26 to the open or ready position when an object is removed from the hanger device 20 That is, when an object is inserted into the hanger device 20, as flexible members 28 and 30 are transformed into their generally "U" shaped position, each flexible member acts as a spring and stores energy sufficient for restoring pivotable arms 24 and 26 to their open position and for restoring the flexible members 28 and 30 to their open positions. Many types of cable are capable of this spring action, and thus have properties suitable for use in the present invention. Some known suitable cables include carbon steel wire rope, carbon steel braided cable, and stainless steel aircraft cable.

While the flexible cables 60 and 62 are functional without the resilient casings 82 and 88, casing material such as tubular rubber facilitates the gripping of an object by increasing friction between the object and the flexible members 28 and 30. In many uses a tubular rubber casing 82 and 88 also improves the cleanability of the apparatus. Casing 82 and 88 may also be of other suitable non-rubber compounds which facilitate frictional gripping action between the flexible members and an object being secured. Further, it is not necessary that the flexible members 28 and 30 be built up from steel cable and tubing, as there are a variety of flexible materials amenable to incorporation into a device according to the present invention, including plastic or composite materials, and other flexible solid materials, which have a suitable combination of spring characteristics and frictional capabilities.

It can also readily be appreciated that in lieu of spring force storing flexible gripping members 28 and 30, the location of a spring member acting between frame first side section 38 and pivotable arm 24, and similarly between frame second side section 40 and pivotable arm 26, may accomplish the desired repositioning or automatic opening function of the present invention. Thus, for example, use of tortion springs with suitable moment and deflection angle in a functional location between frame 22 and pivotable arms 24 and 26 will enable the hanger device 20 to be restored to an open or ready position when an object is removed therefrom. Such an embodiment of the hanger device 20 would reliably and securely grip an object, yet retain an important feature of the invention in that the hanger device 20 would automatically return to the open or ready position upon removal of an object with such alternative construction, additional materials, such as rope or cord, could be used for flexible members 28 and 30, as inherent spring characteristics would not be required in the flexible members 28 and 30. Also, it can readily be appreciated that rather than using spring means to automatically re-position the device to an open position, an alternative biasing means, such as counterweights, could be utilized.

FIGS. 9, 10, and 11 illustrate an alternate embodiment of the present invention In FIGS. 9 through 11, wire portions 60 and 62 of elongated flexible members 28 and 30 each have looped ends 64 and 66 respectively which are adapted to be positioned through "U"-shaped brackets 91 and 92 respectively. Flexible "U"-shaped brackets 91 and 92 are secured to support brackets 94 and 95 of frame 22. It can be seen that flexible members 28 and 30 are thus connected at one end to pivotable arms 24' and 26' and at the other end to "U"-shaped brackets 91 and 92 in a manner so that the flexible members 28 and 30 cross each other at a central gripping area 32 as seen, for example, in FIG. 9.

Referring again to the embodiment illustrated in FIGS. 9 through 11, it can be seen that the extended axial ends of pivotable arms 24' and 26' have threaded ends 96 and 97 respectively which are adapted to receive lock nuts 98 and 100 for securing the first end positions of pivotable arms 24' and 26' to the frame 22 while allowing pivoting action of outer end portions of pivotable arms 24' and 26' to occur. Similarly, in above FIGS. 1 through 8, the axial ends of pivotable arms 24 and 26 are fitted with stops 102 and 104 respectively Said stops are secured to axial ends of the first end portions of pivotable arms 24 and 26 via means such as soldered or brazed joints 106 and 108 respectively.

FIG. 12 shows a perspective view of a mobile cart device 110 which utilizes a plurality of hangers 20 which may be utilized to secure live fowl during transport operations Cart 110 generally comprises four main components, these being a frame 112, wheels 114, handles 116, and a plurality of hanger devices 20. Frame 112 is provided with generally "A"-shaped ends 120 and with longitudinal structural elements 122 to rigidly secure ends 120 so as to form a structurally sound frame 112. Four wheels 114 each having independent suspension and directional control are provided to facilitate ease of movement and directional control when propelling part 110 via handles 116 by manual means such as by a workman. A plurality of hanger devices 20 are provided so that a plurality of objects such as live chickens can be transported as desired.

Further, it can be seen then that in another application of hanger device 20, objects such as chickens may be securely grasped in the hanger device 20 when the hanger device 20 is attached to a conveyor belt or the like. Thus, the processing of poultry in a poultry processing plant can be easily accomplished utilizing the hanger device 20 of the present invention.

In summary, it can be seen that in operation, as an object such as chicken legs are pushed into the central gripping location 32 of hanger device 20, the pivotable arms 24 and 26 begin to rotate inwardly and downwardly. As objects are pushed rearwardly against the central gripping area located at 32, said location 32 moves rearwardly toward frame 22, to a new location 32'. Rotation of pivotable arms 24 and 26 also eventually causes flexible members 28 and 30 to cross at a location 71 forward of new central gripping location 32', thereby forming a generally oval area between the new central gripping location 32' and the second crossing location 71. By thus urging an object against the flexible members 28 and 30, the flexible gripping members 28 and 30 curve into two "U"-shaped configurations such that the flexible gripping members 28 and 30 oppose each other then, the flexible gripping members 28 and 30 grip almost completely around an object It can therefore be teen that a grasping action is thus created when an object is inserted into the central gripping area location 32 and the object is urged against the flexible members 28 and 30.

In order to remove objects from the device 20, it is necessary only for the user to lift up on the object or chicken legs. As the during energy stored in the flexible members 28 and 30 is released and allowed to act, pivotable arms 24 and 26 to return the open position From the foregoing it can be seen that the applicant's present device for gripping or suspending an object provides an easily used device which reliably holds an object and which easily releases an object and returns to an open position without manipulation of the device. The present gripping device is especially useful in transportation of live poultry, in processing of poultry, and for securing tools, but its application is not limited thereto.

It will be apparent after studying the drawings and reading the description of the various embodiments that changes may be made in the arrangement and positioning of the parts within the spirit and scope of the invention. Thus, the foregoing description of embodiments of the invention have been presented for purposes of illustration and description and for providing an understanding of the invention. It is not intended to be exhaustive or to limit the invention to the precise forms disclosed. On the contrary, the intention is to cover all modifications, equivalents and alternatives falling within the spirit and scope of the invention as expressed in the appended claims. Obviously, many modifications and variations are possible in light of the above teaching The particular embodiments were chosen and described in some detail to best explain the principles of the invention and its practical application to thereby enable others skilled in the relevant art to best utilize the invention in various embodiments and with various modifications as are suited to the particular use contemplated. Changes and modifications from the specifically described embodiments can be carried out without departing from the scope of the invention. It is intended that the invention be defined by the appended claims.

What is claimed is:

1. An apparatus to releasably engage and support an object, said apparatus having a front end and a rear end and comprising:
   a. a base having first and second laterally spaced side sections defining therebetween a forwardly open gripping area to receive said object;
   b. a pair of first and second arms, each having first end portions pivotally connected to said first and second side sections, respectively, and also having second outer end portions, said arms being movable from a forwardly extending open position rearwardly and toward one another to a gripping position;
   c. a pair of first and second flexible gripping members, each having a first end and a second end, the first end of the first gripping member being connected to the second outer end portion of the first arm, and also having a second end connected to said second section, said second flexible gripping member having a first end connected to the second end portion of the second arm and a second end connected to said first section; and
   d. said arms and said gripping members being arranged in a manner that in the open position, the two gripping members extend oppositely across said gripping area, and in the gripping position said first and second gripping members form first and second loops, respectively, to engage said object in said gripping area.

2. The apparatus as recited in claim 1, therein said first and second arms are arranged so that in the gripping position, the first and second arms extend oppositely to one another across an open forward portion of said gripping area, whereby when said object is moved forwardly from said gripping area, said arms are moved toward the forwardly extending open position.

3. The apparatus as recited in claim 2, therein the first end portions of the first and second arms are connected to forward portions of said first and second side sections.

4. The apparatus as recited in claim 1, therein the second end of the first gripping member is connected to said second section at a location rearwardly of the first end portion of the second arm, and the second end of the second gripping member is connected to the first section at a location rearwardly of the first end portion of the first arm.

5. The apparatus as recited in claim 1, therein the first end portions of the first and second arms are connected to forward portions of said first and second side sections.

6. The apparatus as recited in claim 5, therein the second end of the first gripping member is connected to said second section at a location rearwardly of the first end portion of the second arm, and the second end of the second gripping member is connected to the first section at a location rearwardly of the first end portion of the first arm.

7. The apparatus as recited in claim 6, therein in the open position said first gripping member extends over said second gripping member, and with said first and second arms moving toward said gripping position, the second outer end portion of the second arm extends over the second outer end portion of the first arm, to cause said second gripping member to cross over said first gripping member.

8. The apparatus as recited in claim 7, therein said first and second arm members are pivotally mounted in a manner that the arms members have a downward component of motion in moving to the gripping position, thereby gravitational force acting on said object urges said arms toward said gripping position.

9. The apparatus as recited in claim 1, therein in the open position said first gripping member extends over said second gripping member, and with said first and second arms moving toward said gripping position, the second outer end portion of the second arm extends over the second outer end portion of the first arm, to cause said second gripping member to cross over said first gripping member.

10. The apparatus as recited in claim 9, wherein said first and second arm members are pivotally counted in a manner that the arm members have a downward component of motion in moving to the gripping position, whereby gravitational force acting on said object urges said arms toward said gripping position.

11. The apparatus as recited in claim 1, wherein said first and second arm members are pivotally mounted in a manner that the arm members have a downward component of motion in moving from said open position to said gripping position, whereby gravitational force acting on said object urges said arms toward said gripping position.

12. The apparatus as recited in claim 11, wherein said pivot mountings for said first and second arms are inclined with respect to said base by an angle beta ($\beta$), said angle beta selected from a range between thirty five degrees (35°) and seventy degrees (70°).

13. The apparatus as recited in claim 9, wherein said first arm and said second arm are displaceable from said open position to said gripping position therein said first and second arms are configured in an overlapping fashion without interference between said first and second arms.

14. The apparatus as recited in claim 9, wherein said first side section of said base is offset from the plane of said second side section of said base by an angle alpha ($\alpha$), said angle alpha selected from a range between five degrees (5°) and fifteen degrees (15°), thereby providing clearance between said first and second arms as said first and second arms are displaced from said open position to said gripping position 15. A device as recited in claim 1, wherein said first and second flexible gripping members form interlocking opposing "U"-shaped loops as said device is displaced toward said object gripping position, thereby securing said object between said interlocking first and second flexible gripping members.

16. A device as recited in claim 15, wherein said interlocking opposing "U"-shaped loops formed by said first and second flexible gripping members are arranged in a substantially horizontal configuration.

17. The apparatus as recited in claim 1 further including biasing means adapted so as to urge said first and second arms and said first and second flexible gripping members toward said open position.

18. The apparatus as recited in claim 17, wherein said biasing means comprises one or more springs.

19. The apparatus as recited in claim 18, wherein said spring biasing means is provided by said first and second flexible gripping members.

20. An automatic action object grasping device comprising:
   a. a U-shaped frame, said frame having first and second laterally spaced side sections,
   b. a first arm, said arm having a first end and a second end, said first end of said first arm being pivotably mounted on said first side section of said frame,
   c. a second arm, said second arm having a first end and a second end, said first end of said second arm being pivotably mounted on said second side section of said frame,
   d. a first flexible gripping member, said first flexible gripping member having a first end and a second end, said first end of said first flexible gripping member secured to said second end of said first arm, and said second end of said first flexible gripping member secured to said Second side section of said frame,
   e. a second flexible gripping member, said second flexible gripping member having a first end and a second end, said first end of said second flexible gripping member secured to said second end of said first arm, and said second end of said second flexible gripping member secured to said first side section of said frame,
   f. said first flexible gripping member and said second flexible gripping member being adapted to form a forwardly open "X"-shaped object grasping area between said second ends of said first and second arms,
   g. said first and second arms and said first and second flexible gripping members being moveable between:
      (i) an open position in which said object can be inserted into said "X"-shaped object grasping area, and
      (ii) a closed position in which said flexible gripping members form opposing interlocking "U"-shaped loops and engage said object to secure said object in said hanger device,
   h. said flexible gripping members storing potential energy as said flexible gripping members are displaced from said open position to said closed position,
   i. said stored energy providing at least enough energy to restore said first and second arms and said first and second flexible gripping members to said open position when said object is removed from said device.

* * * * *